(12) United States Patent
Morgan et al.

(10) Patent No.: US 12,056,758 B2
(45) Date of Patent: Aug. 6, 2024

(54) VIRTUAL REALITY SHOPPING

(71) Applicant: NCR Voyix Corporation, Atlanta, GA (US)

(72) Inventors: Kip Oliver Morgan, Atlanta, GA (US); Theodore Chen, Atlanta, GA (US); Geoffrey Dodd, Atlanta, GA (US); May Hu, Atlanta, GA (US); Karhan Jones, Atlanta, GA (US); Raheel Jooma, Atlanta, GA (US); Kelli Lee, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 17/245,975

(22) Filed: Apr. 30, 2021

(65) Prior Publication Data
US 2022/0351281 A1 Nov. 3, 2022

(51) Int. Cl.
*G06Q 30/0601* (2023.01)
*G06Q 30/0226* (2023.01)
(Continued)

(52) U.S. Cl.
CPC ..... *G06Q 30/0643* (2013.01); *G06Q 30/0226* (2013.01); *G06Q 30/0623* (2013.01);
(Continued)

(58) Field of Classification Search
CPC .......... G06Q 30/0643; G06Q 30/0226; G06Q 30/0623; G06Q 30/0631; G06Q 30/0633; H04L 51/02; G10L 2015/088
(Continued)

(56) References Cited

U.S. PATENT DOCUMENTS

| | | | | |
|---|---|---|---|---|
| 9,824,391 | B2 * | 11/2017 | Glazer | ............... G06Q 30/0643 |
| 2007/0192203 | A1 * | 8/2007 | Di Stefano | ........ G06Q 30/0633 |
| | | | | 705/26.8 |

(Continued)

OTHER PUBLICATIONS

Schnack, Alexander, et al, "Does the locomotion technique matter in an immersive virtual store environment?—Comparing motion tracked walking and instant teleportation", Jan. 2021, Journal of Retailing and Consumer Services vol. 58, Jan. 2021, 102266 (Year: 2021).*

(Continued)

*Primary Examiner* — Marissa Thein
*Assistant Examiner* — Thomas Joseph Sullivan
(74) *Attorney, Agent, or Firm* — Schwegman Lundberg & Woessner, P.A.

(57) ABSTRACT

Items are identified from one or more catalogues and images of the items are obtained. A dynamically rendered Virtual Reality (VR) store is constructed from the images and from images of objects/structures associated with a store. The item images that populate the VR store can be customized to a given customer and/or a given store. A VR session is established with a customer within the VR store, the item images can be selected, examined, and purchased during the session by the customer as the customer navigates through (Continued)

the VR store. Specialized rooms during the VR session allow the customer to interact in real time with other customers shopping via other VR sessions. The customer and other customers are rendered as avatars within the specialized room. A designated avatar or automated chatbot provides automated and real time assistance to the customer during the VR session.

2 Claims, 3 Drawing Sheets

(51) Int. Cl.
  *H04L 51/02* (2022.01)
  *G10L 15/08* (2006.01)
(52) U.S. Cl.
  CPC ..... *G06Q 30/0631* (2013.01); *G06Q 30/0633* (2013.01); *H04L 51/02* (2013.01); *G10L 2015/088* (2013.01)
(58) Field of Classification Search
  USPC ........................................................ 705/27.2
  See application file for complete search history.

(56) References Cited

U.S. PATENT DOCUMENTS

| | | | |
|---|---|---|---|
| 2016/0210602 A1* | 7/2016 | Siddique | G06Q 20/047 |
| 2018/0174122 A1* | 6/2018 | Mattingly | H04L 9/3239 |
| 2019/0066198 A1* | 2/2019 | Keeler | G06F 3/04815 |
| 2019/0325498 A1* | 10/2019 | Clark | G06Q 30/0625 |
| 2021/0200943 A1* | 7/2021 | Aviyam | G06F 16/953 |

OTHER PUBLICATIONS

Sayyad, Ehsan, et al, "Walking and Teleportation in Wide-area Virtual Reality Experiences", 2020, IEEE International Symposium on Mixed and Augmented Reality (ISMAR) (Year: 2020).*
Buckley, S., "Why 'teleportation' makes sense in virtual reality", Oct. 7, 2016, engadget (Year: 2016).*
Ye, Lu, et al, "Design and Implementation of a Collaborative Virtual Shopping System", 2004, International Conference on Computer Supported Cooperative Work in Design (Year: 2004).*
"Walmart," 2017, retrieved Feb. 26, 2021 via Wayback Machine, Mutual Mobile, "mutualmobile.com/walmart" (Year: 2021).*
Speicher, Marco, et al, "A Virtual Reality Shopping Experience using the Apartment Metaphor," May 2018, AVI '18: Proceedings of the 2018 International Conference on Advanced Visual Interfaces (Year: 2018).*

\* cited by examiner

VIRTUAL REALITY SHOPPING

BACKGROUND

COVID19 has dramatically changed behaviors of consumers and retailers. Consumers and retailers are now vastly more aware of health safety, which is designed to mitigate the spread of the virus. For example, consumers have been encouraged to stay at home, and when they are unable to stay at home, wear facial coverings and keep at safe physical distances from others while in public, in order to prevent virus transmission. Retailers have reduced consumer capacity, put physical barriers between consumers while dining, labeled floors with markers to inform consumers in line what a safe distance is considered to be, etc.

Restaurants, bars, concerts, sporting events, entertainment venues, hotels, and other industries have been temporarily shut down or have had their capacity limits substantially reduced during the pandemic. Likely the only industry that has not experienced any closures are grocery stores. Logistically, governments are unable to supply adequate and timely food to their citizens, such that grocery stores are considered essential and have remained open. As a result, online grocery ordering, pickup, and delivery services have experienced exponential increases in demand as many individuals are still fearful of venturing out to the grocery stores during the pandemic.

Consumers also engaged in panic buying resulting in shortages of items that were being most frequently bought and also resulting in unintended shortages of other items that did not experience increase demand because of shortages in raw materials needed to make the items lacking the increase demand. Many consumers became frustrated with the shortages especially when they ventured out to the grocery store only to find that seldom used items were out of stock. This further drove consumers to search and buy items both online and instore and further exasperated the shortages by consumers buying items in bulk whenever the items could be found instore or online and even when the consumers were already fully stocked.

Still, many consumers have refused to buy groceries online for a variety of reasons. It is a hassle to manually search for each specific item desired and add it to a virtual cart; it is tedious and difficult to compare similar items for prices, ingredients, and nutritional information without holding and touching the items; the online interfaces often do not accurately reflect available inventory at the store and when they do, an ordered item may be missing from the store shelf by the time a store picker fulfills the customer's online order, such that they only practical way to ensure that the consumer gets a desired item is to be physically present in the store; etc.

Yet, the instore shopping experience has also deteriorated during the pandemic. Social distancing requires customers maintain 6 feet of distance between one another within the store; stores have implemented procedures to reduce customer and staff interaction, such that finding a staff member to assist with customer questions is increasingly difficult; stores have invested a lot of research in laying out the store and the items within the store to ensure that customers remain in the store as long as possible, which means a customer desiring a few staple items has to likely traverse the entire store to get each of the items and finding some items is difficult because the same type of item can be found in multiple different locations throughout the store; etc.

In short, a typical consumer does not enjoy physically going to the grocery store and navigating the aisles especially during the pandemic but most consumers still find going to the grocery store a necessity based on the deficiencies of existing online ordering systems and the experience associated with the online ordering interfaces.

SUMMARY

In various embodiments, methods and a system for Virtual Reality (VR) shopping are presented.

According to an embodiment, a method for VR shopping is provided. For example, item identifiers for items are obtained based on a criteria; each item identifier is mapped to an item image. A model is obtained of a store along with structure images for structures of the store. The item images and the structure images are dynamically rendered in accordance with the model within a VR Store. A VR interface is provided to a customer via a customer-operated device and a VR session is established with the customer through the VR interface. The VR session is managed by tracking, navigating, and assisting the customer during the VR session as the customer navigates through the VR store using the VR interface and selects particular items for inclusion in a cart.

DETAILED DESCRIPTION

Figure 1:
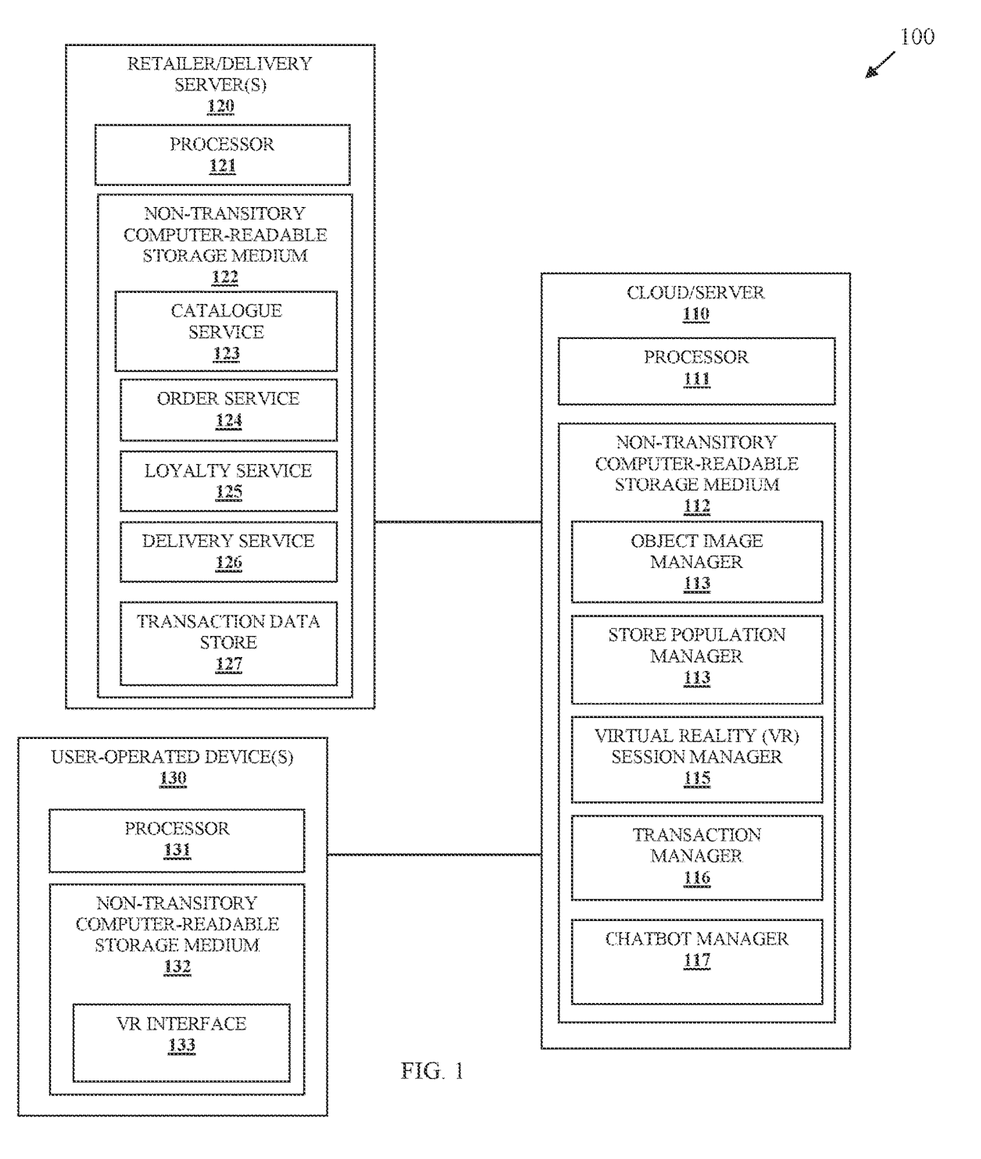
FIG. 1 is a diagram of a system for VR shopping, according to an example embodiment.

FIG. 1 is a diagram of a system 100 for VR shopping, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of VR shopping, presented herein and below.

As will be discussed herein and below, methods and a system 100 are provided for dynamically generated and customized VR stores and VR shopping sessions within the VR stores. Item codes are dynamically obtained from store catalogues and mapped to corresponding item images. Object images for structures, floors, shelves, tables, chairs, walls, carts, baskets, terminals, checkout stations, wall hangings, decorations, etc. are obtained. A model of a store is obtained, and the object images and item images are custom arranged within a dynamically rendered VR store according to the model. The items that populate the VR store and layout of the items within the VR store can be customized based on consumer-selected filters, consumer transaction history, and/or a known store (using a known planogram for the store).

Using a VR interface, the consumer traverses the VR store within a VR session and can select, discard, and inspect the items and the corresponding item information. Selected items are maintained in a cart during the VR session. The consumer can select rooms of the store for real time online interaction with other consumers that are shopping within other VR sessions. The consumers can share items from their carts with one another, audibly talk, or chat with one another as avatars customized by the consumers. A consumer can engage an automated avatar for natural language assistance during the VR session.

A consumer's cart can be prepopulated within the VR session with a consumer shopping list or with items purchased by the consumer during a previous VR session. The consumer is presented with a closest matching item when a selected item is determined to be out of stock during the VR session.

During a checkout for the cart of items, the consumer simulates within the VR session walking up to a transaction terminal for checkout and the display shelves adjacent to the terminal within the VR store are custom populated with items based on a transaction history and/or profile of the consumer for any impulse buying by the consumer. Loyalty points for the transaction are credited to a consumer's loyalty account and payment is processed through a customer-selected or preferred payment method. The consumer can designate the items be picked up or delivered to a consumer designated location.

As will be more completely illustrated herein and below, the consumer is completely immersed within a customized VR store during the VR session with a customer-determined level of real time interaction with other shoppers or with a private shopping experience.

As used herein the terms "user," "consumer," "customer," and/or "shopper" may be used interchangeably or synonymously. These terms refer to an individual engaged in a shopping activity within a dynamically rendered VR store during a VR session.

A "VR store" refers to animated scenes/images/graphics comprising images of real-world items, avatars, floors, shelves, terminals, display cases, chairs, fixtures, decorations, display monitors, structures, designs, text, audio, video, etc. The VR store may also comprise one or more selectable VR rooms. Each VR room providing a particular social interaction feature between customers that are present in a selected VR room at a given moment in time, each customer uniquely identified within the VR room by a unique customer selected avatar. A model provides the structure and arrangement to render the animated scenes/images/graphics within a VR interface to a consumer.

A "VR session" is an interactive network simulation of a real-world shopping trip/journey of a given consumer within a given dynamically rendered VR store through the VR interface. The VR store may comprise the customer visiting or interacting within one or more customer selected VR rooms. Each customer may be shopping in their own independent VR session through their own customized VR store but upon entering a common VR room the customers visually and audibly see and hear the same environment associated with the common VR room and the customers become visible to one another within the common VR room.

The system 100 comprises a cloud/server 110, a plurality of retailer/delivery servers 120, and a plurality of user-operated devices 130.

Cloud/server 110 comprises at least one processor 111 and a non-transitory computer-readable storage medium 112. Medium 112 comprises executable instructions for an object image manager 112, a store population manager 113, a VR session manager 115, a transaction manager 116, and a chatbot manager 117. When the executable instructions are provided to and executed by processor 111, this cause processor 111 to perform the processing discussed herein and below with respect to 113-117.

Each retailer/delivery server 120 comprises at least one processor 121 and a non-transitory computer-readable storage medium 122. Medium 122 comprises executable instructions for a catalogue service 123, an order service 124, a loyalty service 125, and a delivery service. Men the executable instructions are provided to and executed by processor 121, this causes processor 121 to perform operations discussed herein and below with respect to 123-126. Medium 122 also comprises a transaction data store comprising transaction history data and transaction metrics.

Each user-operated device 130 comprises at least one processor 131 and a non-transitory computer-readable storage medium 132. Medium 132 comprises executable instructions for a VR interface or VR application 133. Men the executable instructions are provided to and executed by processor 131, this causes processor 131 to perform operations discussed herein and below with respect to VR interface 133.

Object image manager 113 maintains linkages or mappings between item codes for items that populate stores, corresponding item information for each item identifier/code, and a model image of each corresponding item, Object image manager 113 also maintains images for a variety of structures, floors, walls, ceilings, chairs, shelves, display cases, display monitors, terminals, scanners, checkout stations, wall decorations, doors, etc. Furthermore, object image manager 113 maintains audio snippets for common store sounds, such as and by way of example, beeps and buzzes associated with terminals, scanners, door sensors; crowd background chatter, canned store announcements, etc. Object image manager 113 also maintains base images and image features of avatars.

Store population manager 113 renders a VR store dynamically based on desired items and a store model by obtaining and arranging the corresponding images of the items, avatars, and the various structures into an animated stream of video for a customized VR store or a customized VR room of a given store. The model defines the starting or initial the layout and structure of the VR store which store population manager 133 uses to layout the item images, avatar images, and the structure images.

VR session manager 115 interacts with VR interface 133 for purposes of defining a VR session, determining item codes of a customized VR store from an appropriate catalogue service 123 and activating store population manager 113 to interact with object image manager 113 to dynamically render an initial and starting state for the VR store within the VR session. Each image within the VR store is associated with an object and each object or type of object has functions that can be activated during the session based on customer input or action during the VR session. VR session manager 115 processes the functions to cause the location of the images to change within the store and to cause actions, such as add item to cart, remove item from cart, move to a VR room, show item nutrition information, show item price, show item ingredients, activate an item search, display item discounts, show customer loyalty account information, activate an assistant avatar or chatbot through chatbot manager 117, initiate transaction payment for a cart of the customer through transaction manager 116, activate real-time audio of text chat between customers associated with different VR sessions but both present within a common VR room, traverse the VR store store in a user-defined direction, etc. The state of the VR room changes as actions are taken by the customer during the VR session and the state changes are managed by VR session manager 115. During the session, the current contents of item identifiers for items selected by the customer for placement in the customer's cart are tracked and maintained by VR session manager 115.

VR interface 133 allows the customer to navigate the VR store (or any VR room) through a pointer object that is rendered within the animated stream of the store and controlled by the customer. The customer points the end of a virtual laser pointer to a location up a head or behind the customer's present avatar location within the SR store and double clicks or single clicks and the location of the avatar is transported to the end of the pointer. In other cases, when user-operated device 130 includes VR input devices, the customer can walk in place or within a defined area and the act of walking is detected by the VR input device causing VR session manager to move the customer's avatar through the VR store. Touches of the customer on an item within the VR interface 133 causes the item to be placed in the customer's cart, a touch and hold displays item nutrition, pricing, and ingredient information, a touch from the cart of the item image with a swipe causes the item to be thrown to the floor within the VR store and removed from the customer's cart. It is noted that these are sample interactions and other interactions, types of touches, or natural language instructions spoken by the customer during the VR session can be used by VR session manager 115 to detect and process customer interaction with the items of the VR store and navigate the customer through the VR store (or a VR room within the VR store).

VR interface 133 also provides a menu of selectable options within controls that are always within view of the customer from the customer's current location within the VR store. Some of these selectable options may include search for items, compare multiple items, transport to a transaction terminal for checkout with current cart contents, display current cart contents and pricing information, display loyalty account and points of the customer, request an automated chatbot for assistance, etc. VR interface 133 may also allow the customer to change the item contents of the store by applying selectable filters, such as populate the store with just vegan food, just gluten-free food, low sugar or low salt food, etc. Any filter causes VR session manager 115 to interact with catalogue service 123 and store population manager 113 to repopulate the VR store back to an initial state with the requested filters applied such that just the items that meet the filter criteria are populated in the store.

When the customer traverses to or indicates through an option that checkout is desired within the VR session, VR session manager 115 interacts with store population manager 113 to place the customer adjacent to a terminal with a display shelf or case having impulse buy items that the customer can add to the cart before checkout out. The items are determined based on an existing transaction history and/or profile associated with the customer, such that only items on the display shelf appear that the customer has purchased before or is likely to purchase based on analysis of the customer's transaction history. This provides a customized and directed approach to enticing the customer to add additional items to the cart before checkout. The actual items displayed may also be negotiated with retailers, such that the retailers compete or pay to have their items presented on the shelf or presented more prominently on the shelf.

Transaction manager 116 uses a customer profile payment method, a customer provided image of a credit card (provided through VR interface via a camera associated with device 130), a customer-selected payment service, or a digital wallet to obtain payment details from the customer. The payment details are processed, and the customer is asked how the items are to be received through customer pickup at a designated time and location or through delivery through a delivery service 126. When delivery is requested, transaction manager 116 engages an appropriate delivery service 126 and schedules delivery of the items for the transaction. Additionally, transaction manager 116 interacts with the appropriate loyalty service 125 and credits the transaction to a loyalty account of the customer. In some cases, transaction manager 116 may accept all or some of the needed payment for the transaction as loyalty points redeemed by the customer from the customer's loyalty account.

The above-mentioned features are only a subset of available features with system 100. Some additional features are now discussed within the above-noted context.

VR session manager 115 may uses a registered customer identifier for the customer during initiation of a VR session to obtain that customer's transaction history from transaction data store 127. All or some subset of the items previously purchased by the customer and/or recently purchased by the customer are used to populate the initial shelves and display cases of the VR store. Promoted items that are similar to the items in the transaction history of the customer may also be added to the items that are populated in the VR store. For example, the customer may only every purchase brand X of a given item, the VR session manager 115 may populate with brand X but also include brand Y along with a promotion from a retailer to entice the customer to change to brand Y during the VR session.

A profile of the customer may include a customer shopping list, such that VR session manager 115 automatically and initially populates the cart of the customer with the items from the shopping list. The customer can then inspect the cart and remove any items that the customer determined he/she no longer wants.

When VR session manager 115 determines a selected item or an item on a shopping list is out of stock, a closest matching substitute item is presented to the customer during the VR session for selection as an alternative to the out of stock item.

When the customer activates an assistant option within the VR session, an automated avatar or chat text box is presented to the customer for a natural language dialogue between the customer and a chatbot. VR session manager 115 activates chatbot manager 117 and chatbot manager 117 initiates the natural language chatbot for customer assistance. The customer can type natural language questions or can speak through voice (which is captured by a microphone of device 130 and translated to text for processing by the chatbot). Whether the chatbot appears as a chat text box or as an avatar within the VR store is a configurable option selected by the user. In some cases, a wake-up word may be used to activate the chatbot during the VR session through the VR interface 133. For example, VR interface 133 listens for the customer to say, "can you help me," "i need help," "help," "assistance is needed," etc. The automated assistant can also be always active and listening or monitor activity of the customer for providing assistance as well. For example, the user may be holding within the VR session an item for over a predetermined amount of time with no detectable activity, in this case the automated chatbot may autonomously engage the customer asking if the customer needs assistance on the item; the customer may be aimless wondering throughout the VR store without having selected an item for a predetermined period of time, the automated chatbot may autonomously ask the customer if the customer is looking for a specific item or needs help locating the specific item within the VR store; etc.

When the customer navigates to a specialized VR room, the VR session is exposed to other currently ongoing VR shopping sessions of other customers within a VR room. VR interface 133 provides options to let the customer interact through text chats or live voice audio with other customers within the VR room. Additionally, other options not available outside the VR room become available to the customer for selection, such as show my cart to another designated customer, add an item from a designated customer's cart to the customer's cart, exchange contact information, take a snapshot of the customer avatar and another customer's avatar and post it to a social media account, etc.

The specialized VR rooms may be based on current customers that are vegan, vegetarian, interested in organic foods, gluten conscious, conservation conscious, etc. In this way, the customer can interact and socialize with customers of a particular interest to the customer. One specialized VR room may not require any specialized interest, such that a wide variety of customers may frequent that room with one another.

The model for the store may be based on an actual physical store that the customer frequents. In this situation, the store's planogram is used within the model to ensure the layout and item placement within the layout comports with the physical store. This may be useful to customers that desire familiarity.

Items associated with existing promotions or rebates may be displayed within the VR store with a visual cue; for example, a red explanation mark. Selected items associated with promotions may present the details of the promotion when the customer selects the items. An option may allow the customer to see all the available promotions associated with the current contents of the customer's cart.

A VR interface option may allow the customer to add items searched for directly to the cart without traversing to the location of the store where the desired item is located.

Shelf placement of the items can be negotiated with manufacturers, suppliers, and retailers, such that prime item placement can be associated with fees to a provider of cloud/server 110.

System 100 immerses the customer into a customized VR store with visual and audible sensory features. The items that populate the store are customizable by the customer, can be based on the customer's transaction history, can be based on filters for specific types of items, and/or can be based on an actual specific physical store. The VR store is dynamically rendered at the start of a VR session. The VR session is an animated stream that the customer navigates through with a variety of interaction options with the items and with other customers currently shopping. Media images of items, avatars, and structures provide a cost effective and time efficient mechanism by which the VR stores are dynamically rendered. The customer gets the full experience of shopping at a real-world store while having a plethora of features and options that make shopping and assistance easier than in person shopping and more seamless than in person shopping while also completely eliminating any possibility of catching or transmitting COVID19 or any other virus.

In an embodiment, the use-operated device 130 is a desktop computer, a laptop computer, a tablet, a phone, or a wearable processing device.

In an embodiment, the user-operated device 130 is a VR device enhanced with a new VR interface or app 133, such as Oculus Quest®, etc. In this embodiment, the device 130 may include a variety of VR input devices, such as hand controllers, etc.

Figure 2:
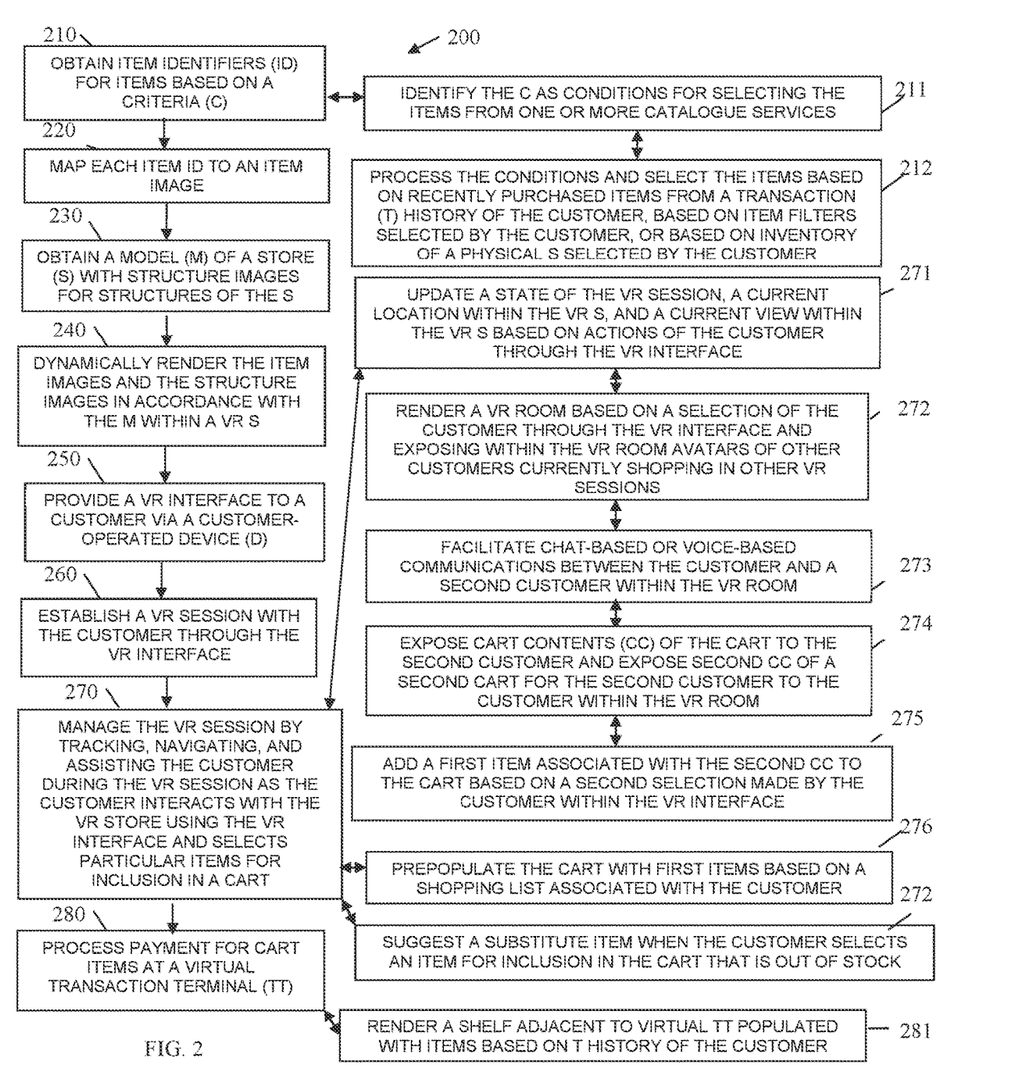
FIG. 2 is a diagram of a method for VR shopping, according to an example embodiment.
Figure 3:
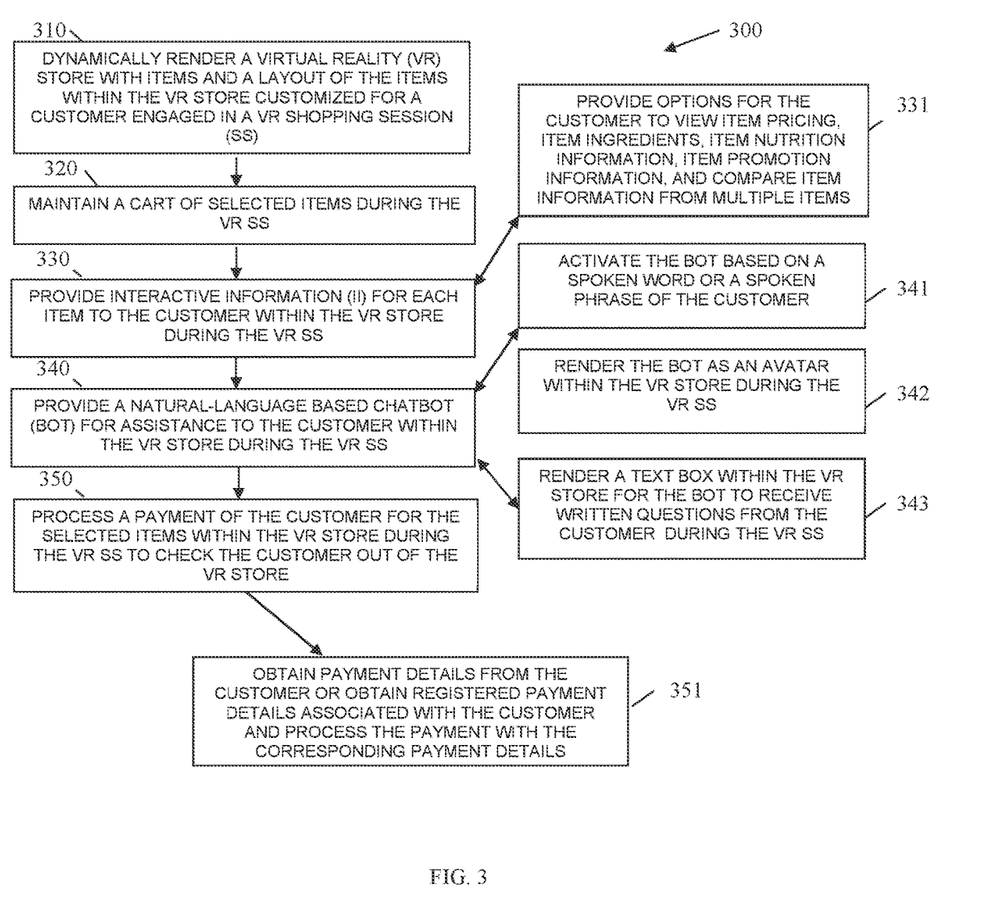
FIG. 3 is a diagram of another method for VR shopping, according to an example embodiment.

The above referenced embodiments and other embodiments are now discussed with FIGS. 2-3.

FIG. 2 is a diagram of a method 200 for VR shopping, according to an example embodiment. The software module(s) that implements the method 200 is referred to as a "VR shopping manager." The VR shopping manager is implemented as executable instructions programmed and residing within memory and/or a non-transitory computer-readable (processor-readable) storage medium and executed by one or more processors of one or more devices. The processor(s) of the device(s) that executes the VR shopping manager are specifically configured and programmed to process the VR shopping manager. The VR shopping manager may have access to one or more network connections during its processing. The network connections can be wired, wireless, or a combination of wired and wireless.

In an embodiment, the VR shopping manager executes on cloud 110. The cloud 110 comprises one or more servers that are logically assembled and cooperate as a single server.

In an embodiment, the VR shopping manager executes on a combination of cloud 110 and servers 120.

In an embodiment, the VR shopping manager is all of or some combination of 113-117 and/or 123-126.

At 210, the VR shopping manager obtains item identifiers for items based on a criteria.

In an embodiment, at 211, the VR shopping manager identifies the criteria as conditions for selecting the items from one or more catalogue services 123.

In an embodiment of 211 and at 212, the VR shopping manager processes the conditions to select the appropriate items based on recently purchased items from a transaction history of the customer (using transaction data store 127), based on item filters selected by the customer (types of items and/or brands of items), and/or based on an inventor of a physical store selected by the customer.

At 220, the VR shopping manager maps each item to a corresponding item image.

At 230, the VR shopping manager obtains a model (schema) of a store with structure images for structures of the store.

At 240, the VR shopping manager dynamically renders the items images and the structure images in accordance with the model within a VR store.

At 250, the VR shopping manager provides a VR interface 133 to a customer via a customer-operated device 130.

At 260, the VR shopping manager establishes a VR session with the customer through the VR interface 133.

At 270, the VR shopping manager manages the VR session by tracking, navigating, and assisting the customer during the VR session as the customer interacts with the VR store using the VR interface 133 and as the customer selects particular items for inclusion of a cart of the customer.

In an embodiment, at 271, the VR shopping manager updates a state of the VR session, a current tracked location of the customer within the VR store, and a current view within the VR store based on actions of the customer through the VR interface 133.

In an embodiment of 271 and at 272, the VR shopping manager renders a VR room based on a selection of the customer through the VR interface 133 and exposes within the VR room avatars of other customers currently shopping in other VR sessions.

In an embodiment of 272 and at 273, the VR shopping manager facilitates chat-based or voice-based communications between the customer and a second customer present within the VR room.

In an embodiment of 273 and at 274, the VR shopping manager exposes cart contents of the cart for the customer to the second customer and exposes second cart contents of a second cart for the second customer to the customer within the VR room during the VR session.

In an embodiment of 274 and at 275, the VR shopping manager adds a first item associated with the second cart contents to the cart of the customer based on a second selection made by the customer within the VR interface 133 during the VR session.

In an embodiment, at 276, the VR shopping manager prepopulates the cart with first items based on a shopping list associated with the customer.

In an embodiment, at 277, the VR shopping manager suggests a substitute item when the customer selects an item for inclusion in the cart that is determined to be out of stock.

In an embodiment, at 280, the VR shopping manager processes a payment for cart items at a virtual transaction terminal within the VR store during the VR session.

In an embodiment of 280 and at 281, the VR shopping manager renders a shelf adjacent to the virtual transaction terminal that is populated with items based on a transaction history of the customer or based on a calculated prediction of items that the customer is likely to impulse buy based at least in part on the transaction history of the customer (again the transaction history obtained from transaction data store 127).

FIG. 3 is a diagram of a method 300 for VR shopping, according to an example embodiment. The software module(s) that implements the method 300 is referred to as a "custom VR shopping service." The custom VR shopping service is implemented as executable instructions programmed and residing within memory and/or a non-transitory computer-readable (processor-readable) storage medium and executed by one or more processors of one or more devices. The processor(s) of the device(s) that executes the custom VR shopping service are specifically configured and programmed to process the custom VR shopping service. The custom VR shopping service may have access to one or more network connections during its processing. The network connections can be wired, wireless, or a combination of wired and wireless.

In an embodiment, the custom VR shopping service executes on cloud 110.

In an embodiment, the custom VR shopping service executes on a combination of cloud 110 and servers 120.

In an embodiment, the custom VR shopping service is all of, or some combination of 113-117, 123-127, and/or the method 200.

The custom VR shopping service represents another and, in some ways, an enhanced processing perspective from that which was discussed above with method 200 and/or system 100.

At 310, the custom VR shopping service dynamically renders a VR store with items and a layout of the items placed within the VR store that are customized for a customer engaged in a VR shopping session.

At 320, the custom VR shopping service maintains a virtual cart of selected items during the VR shopping session that the customer has selected for purchase.

At 330, the custom VR shopping service provides interactive information for each item to the customer within the VR store during the VR shopping session based on touches or types of touches made by the customer on images of the items.

In an embodiment, at 331, the custom VR shopping service provides options for the customer to view item pricing, item ingredients, item nutrition information, item promotion information, and compare item information from multiple items.

At 340, the custom VR shopping service provides a natural-language based chatbot for assistance to the customer within the VR store during the VR shopping session.

In an embodiment, at 341, the custom VR shopping service activates the chatbot based on a spoken word or a spoken phrase of the customer.

In an embodiment, at 342, the custom VR shopping service renders the chatbot as an avatar within the VR store during the VR shopping session.

In an embodiment, at 343, the custom VR shopping service renders a text input box within the VR store for the chatbot to receive written questions from the customer during the VR shopping session.

It is noted that embodiments 341-343 are not mutually exclusive such that any combination of all of these embodiments may be provided with the teachings herein.

At 350, the custom VR shopping service processes a payment of the customer for the selected items within the VR store during the VR shopping session to check the customer out of the VR store.

In an embodiment, at 351, the custom VR shopping service obtains payment details from the customer or obtains registered payment details associated with the customer and the custom VR shopping service processes the payment with the corresponding payment details.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:
1. A system comprising:
a cloud processing environment comprising at least one server;
the at least one server comprising at least one processor and a non-transitory computer-readable storage medium;
the non-transitory computer-readable storage medium comprising executable instructions; and
the executable instructions when executed by the at least one processor from the non-transitory computer-readable storage medium cause the at least one processor to perform operations comprising:
  custom rendering and custom populating a Virtual Reality (VR) store with item images associated with items for a customer during a VR session to simulate a real-world shopping experience;
  providing a VR interface to a customer-operated device for navigating the VR store during the VR session wherein providing further includes providing a VR laser pointer within the VR session for operation by the customer during the VR session;
  providing interactive information for selected items associated with selected item images within the VR store during the VR session through the VR interface;
  providing a natural-language chatbot for assistance within the VR store during the VR session through the VR interface;
  providing selectable VR rooms that the customer can navigate to within the VR store during the VR session through the VR interface for real-time interaction with other customers associated with other VR sessions;
  providing options via the VR interface for the customer to expose cart contents of a cart of the customer to a different customer, expose different cart contents of a cart for the different customer to the customer, and add a particular item of the different cart to the cart of the customer when the customer navigates to a particular one of the VR rooms;
  managing the VR session by tracking, navigating, and assisting the customer during the VR session, wherein managing further includes permitting the customer to navigate to a location by walking in place or by one of walking within a defined area during the VR session, by pointing the laser pointer at the location visible within the VR session causing the VR session to transport a view of the customer during the VR session directly to the location, or by the customer providing spoken instructions to navigate to the location, wherein managing further includes presenting item details for a certain item when the customer touches and holds the touch on the certain item during the VR session, wherein managing further includes facilitating removal of a cart item from the cart when the customer touches the cart item in the cart and throws it to a floor during the VR session or when the customer provides removal spoken instructions to remove the cart item from the cart, wherein assisting further includes also permitting the customer to provide other spoken instructions to obtain the item details;
  rendering a virtual transaction terminal and a display shelf of custom populated items within the VR store during the VR session when the customer navigates to a checkout area of the VR store or when the customer selects a checkout option through the VR interface; and
  processing a payment for remaining cart items present in the cart of the customer and processing loyalty credits for a loyalty account of the customer from the virtual transaction terminal to checkout the customer from the VR store and end the VR session.

2. The system of claim 1, wherein the customer-operated device is a desktop computer, a laptop computer, a tablet computer, a phone, a wearable processing device, or a VR device that comprises at least one VR input device operated by the customer to provide input to the VR interface.

* * * * *